A. H. HEYROTH.
WIND WHEEL ELECTRIC GENERATOR.
APPLICATION FILED FEB. 9, 1916.
1,233,232.
Patented July 10, 1917.
2 SHEETS—SHEET 1.
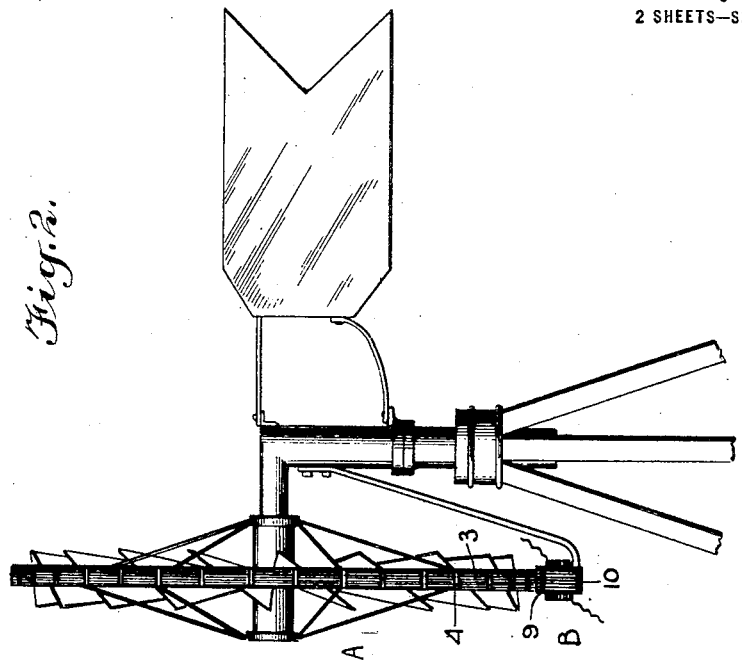
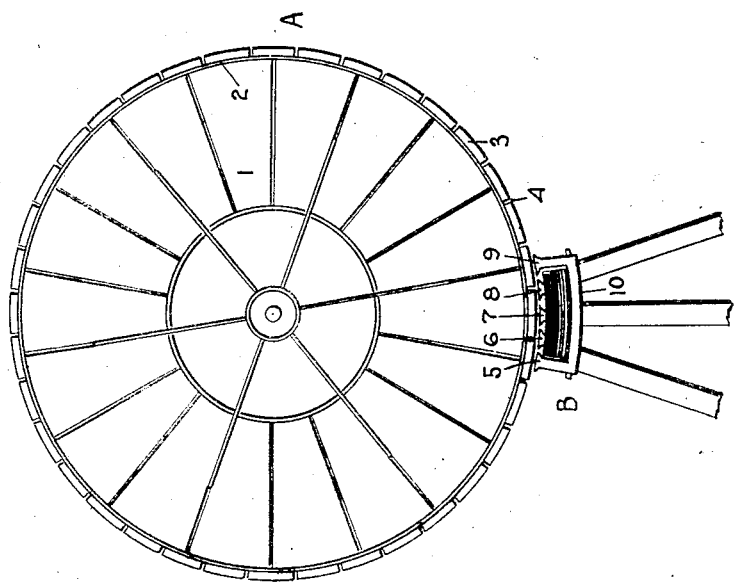
WITNESSES
INVENTOR
A. H. Heyroth
BY
ATTORNEYS

UNITED STATES PATENT OFFICE.

ALBERT HERMAN HEYROTH, OF GERALDINE, MONTANA.

WIND-WHEEL ELECTRIC GENERATOR.

1,233,232.   Specification of Letters Patent.   Patented July 10, 1917.

Application filed February 9, 1916. Serial No. 77,171.

*To all whom it may concern:*

Be it known that I, ALBERT H. HEYROTH, a citizen of the United States, and a resident of Geraldine, in the county of Chouteau and State of Montana, have invented a new and Improved Wind-Wheel Electric Generator, of which the following is a full, clear, and exact description.

This invention relates to electric generators especially adapted for use in connection with wind mills in which the wheel thereof forms the rotor of the generator.

The invention has for its general objects to improve the design and construction of generators of this type so as to be reliable and efficient in use, durable, substantial and inexpensive, and which requires practically no attention.

A more specific object of the invention is the provision of a novel arrangement of poles forming the stator of the generator, certain of which poles have inducing and induced windings, and some are unwound so that by coöperation with inductors or metallic shoes of the wind wheel the passage of the inductors across the poles will generate an electromotive force in the induced winding for any desired electrical purpose.

With such objects in view, and others which will appear as the description proceeds, the invention comprises various novel features of construction and arrangement of parts which will be set forth with particularity in the following description and claims appended hereto.

In the accompanying drawings which illustrate one embodiment of the invention and wherein similar characters of reference indicate corresponding parts in all the views, Figure 1 is a face view of a wind mill with the electric generator applied thereto;

Fig. 2 is a side view; and

Figure 3:
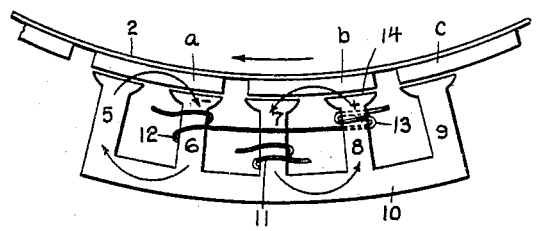
Figs. 3, 4 and 5 are diagrammatic views showing the paths of the magnetic flux through the various poles during the generation of one cycle of alternating electromotive force in the induced winding.

Referring to the drawings, A designates the rotor of the generator and B the stator, the rotor being in the present instance a wind wheel 1 which has on its periphery 2 a plurality of inductors or metal shoes 3 which are arranged end to end and separated by small gaps 4. These inductors 3 pass across the stator B, which may extend over any desired portion of the circumference of the rotor.

Figure 4:
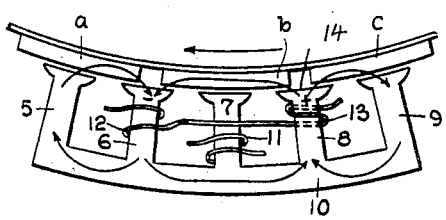
Figure 5:
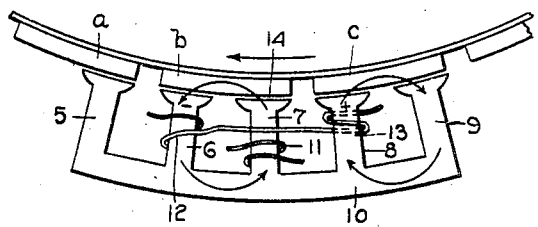

Assuming the stator to be constructed with five poles, the five poles 5, 6, 7, 8 and 9 are connected with a common yoke 10, and these poles, as well as the inductors, are preferably made of laminations. On the middle pole 7 is an induced or armature winding 11, while on the poles 6 and 8, at opposite sides of the central pole 7, are energizing windings 12 and 13 reversely arranged on the respective poles so as to cause the pole 6 to be negative and the pole 8 to be positive, according to the direction of flow of the energizing current. The outer poles 5 and 9 are left unwound and are used for the purpose of insuring a practically uniform flux through the adjacent poles 6 and 8. The poles of the stator are so spaced, with respect to the inductors or shoes, that two pole faces 14, plus the intervening gap, equals the length of one inductor, as shown in position, Fig. 3, and one pole face plus the two adjacent gaps is somewhat less than the length of one inductor, thereby allowing the inductor to slightly lap over the preceding and succeeding pole faces when it is symmetrical with the pole face in question, as shown in Fig. 4. By this arrangement, the movement of an inductor or shoe $b$ past the pole 7 will produce a full cycle of electromotive force in the induced winding 11 in the following manner:

Taking inductor $b$ as a reference point, Fig. 3 shows $b$ bridging poles 7 and 8. At this instant the rate of change of the flux through pole 7 is zero or minimum, and the E. M. F. induced in winding 11 is 0 or minimum. As $b$ advances in the direction of the arrow, the E. M. F. induced in winding 11 increases due to the increasing rate of change of the flux through pole 7. When inductor $b$ has reached the position indicated in Fig. 4, the rate of change of the flux through pole 7 is maximum, and the E. M. F. induced in winding 11 is also maximum. As inductor $b$ moves on, the rate of change of flux through pole 7 decreases, causing a corresponding decrease of E. M. F. in the induced winding 11. When inductor $b$ has reached the position shown in Fig. 5, the rate of change of flux through pole 7 has again reached its 0 or minimum value, and the E. M. F. induced in winding 11 likewise again attains its minimum value. Hence, the movement of inductor *b* from the position shown in Fig. 3 to that shown in Fig. 5 induces one half cycle of E. M. F. in winding 11. The cycle is completed by the further movement of the rotor, the maximum for this half, being reached when the space between inductors *b* and *c* has reached a position symmetrical with pole 7.

When inductor *c* has reached the position occupied by inductor *b* in Fig. 3, the cycle under consideration is completed, and a new cycle is about to be begun. With the passage of each inductor a complete cycle of electromotive force is produced in the induced winding 11, and as the dummy poles 5 and 9 are introduced into the magnetic circuits of poles 6 and 8, respectively, when the magnetic circuits between the latter and pole 7 are interrupted, the flux through the energized poles 6 and 8 is nearly uniform, irrespective of the motion of the rotor, thereby preventing the generation of counter electromotive force in windings 12 and 13, and confining the variations in magnetic flux to winding 11. The terminals of the induced winding 11 may be connected with a rectifier to change the alternating current into continuous current when such is desired, and furthermore, a portion of this direct current may be utilized for the energizing windings 12 and 13. The number of inductors as well as groups of stator poles with inducing and induced windings may be varied as desired.

A construction such as that described is simple and durable, as all the windings and connections are stationary and can be rendered weatherproof, and are free from mechanical strain or wear, the moving parts of the generator being confined to the wind wheel and its shaft so that mechanical friction is limited to one bearing. Gears or mechanical couplings are entirely eliminated, resulting in high mechanical efficiency and small maintenance, cost and attention. The invention can be applied to any standard type of wind wheel. The inductors being applied to the periphery of the wheel add weight thereto so as to produce a flywheel effect which renders the wheel less responsive to sudden fluctuations of wind velocity, thereby obviating sudden voltage fluctuations and insuring better regulation in average constant wind and easy regulation of voltage in average increasing or decreasing wind velocity.

Having thus described my invention, I claim as new and desire to secure by Letters Patent:

1. An electric generator comprising stator and rotor elements, the stator element including a group of five poles, an induced winding on the center pole, and energizing windings on the poles at opposite sides of the center pole, the rotor element comprising a wind-wheel upon the periphery of which is mounted a multiplicity of inductors, the number of which determines, per revolution of the rotor, the periodicity of the electromotive force induced in the said induced winding of the stator.

2. An electric generator comprising stator and rotor elements, one element including a group of five poles, the center one of which is provided with an induced winding and the outer poles being unwound and the intermediate poles being provided with energizing windings of opposite polarity, and the other element having inductors for controlling the magnetic fluxes.

3. An electric generator comprising stator and rotor elements, one element including outer unwound poles, a central pole having an induced winding, and intermediate poles having windings connected in series for producing respectively positive and negative polarity, the other element having inductors, each of such length as to approximately overlie two adjacent poles and intermediate gap.

4. An electric generator comprising stator and rotor elements, the stator element including a group of an uneven number of poles, and inducing and induced windings on the poles in such relation as to produce alternating current, the rotor element consisting of a wind-wheel having inductors arranged as a heavy peripheral rim, the inertia of which, acts to prevent sudden speed fluctuations of the wind-wheel.

In testimony whereof I have signed my name to this specification in the presence of two subscribing witnesses.

ALBERT HERMAN HEYROTH.

Witnesses:
  Mrs. LOUISE RUNK,
  H. M. MAGNUSON.